US012013665B2

United States Patent
Leimone

(12) United States Patent
(10) Patent No.: US 12,013,665 B2
(45) Date of Patent: Jun. 18, 2024

(54) TIMEPIECE WITH LIGHT-AMPLIFYING DESIGN

(71) Applicant: John Paul Leimone, Oakland, CA (US)

(72) Inventor: John Paul Leimone, Oakland, CA (US)

( * ) Notice: Subject to any disclaimer, the term of this patent is extended or adjusted under 35 U.S.C. 154(b) by 0 days.

(21) Appl. No.: 18/305,902

(22) Filed: Apr. 24, 2023

(65) Prior Publication Data

US 2023/0359148 A1 Nov. 9, 2023

Related U.S. Application Data

(60) Provisional application No. 63/364,239, filed on May 5, 2022.

(51) Int. Cl.
*G04B 19/30* (2006.01)
*G04B 19/06* (2006.01)

(52) U.S. Cl.
CPC ............. *G04B 19/30* (2013.01); *G04B 19/06* (2013.01)

(58) Field of Classification Search
CPC ........ G04B 19/30; G04B 19/06; G04B 19/32; G04B 45/0015; G04B 19/14; G04C 17/02
See application file for complete search history.

(56) References Cited

U.S. PATENT DOCUMENTS 3,650,599 A 3/1972 Pedersen
3,899,871 A * 8/1975 Kitai ...................... G04B 19/30 368/227
4,115,994 A * 9/1978 Tomlinson ............ G04B 39/00 362/23.15
4,250,575 A * 2/1981 Flumm .................. G04B 19/30 368/227
5,586,089 A 12/1996 McGarvey
5,703,837 A 12/1997 Umemoto et al.
6,512,721 B1 1/2003 Amano et al.
6,697,303 B2 2/2004 Amano et al.
9,377,761 B2 * 6/2016 Zachmann ............ G04B 19/30
2022/0075321 A1 * 3/2022 Kobayashi ............ G04B 19/06

FOREIGN PATENT DOCUMENTS

CH 702574 B1 7/2011
EP 0693718 A1 1/1996
EP 1666992 A1 6/2006
EP 2106716 A1 10/2009
JP 11038158 A 2/1999
JP 2001027883 A 1/2001
JP 2010203817 A 9/2010
KR 101152535 B1 6/2012
KR 2020120004932 U 7/2012
WO 2012134411 A1 10/2012

OTHER PUBLICATIONS

International Search Report and Written Opinion dated Oct. 4, 2023 for PCT Patent Application No. PCT/IB2023/054204.

* cited by examiner

*Primary Examiner* — Edwin A. Leon
(74) *Attorney, Agent, or Firm* — MLO, a professional corp.

(57) ABSTRACT

In embodiments, a timepiece includes a case, a dial in the case, and a reflector underneath the dial. The dial has a plurality of holes through its thickness, wherein the dial is shaped to allow ambient light to enter a region behind the dial. The reflector is configured to direct the ambient light from the region behind the dial to exit through the plurality of holes.

20 Claims, 17 Drawing Sheets

800

810 820 830 840

| Light Collected by Watch Lens | | | | |
|---|---|---|---|---|
| Light Source | | Collected by Lens | | Output from Dial |
| Type | Luminance ($lm/cm^2$ sr) | Illuminance ($lm/cm^2$) | Flux (lm) | Illuminance ($lm/cm^2$) |
| 60W 4″ Incandescent | 12.000 | 0.81 | 0.36 | 0.07 |
| 55W Fluorescent with 15cm Radius | 6.190 | 0.39 | 0.52 | 0.10 |
| Sun at Noon | 160000 | 1272.54 | 66.03 | 12.44 |
| 6″ Spot Light with 40°Full Angle (1000 lm) | 7.467 | 0.76 | 0.51 | 0.10 |

FIG. 8

| 5 LIGHT SOURCE REFLECTOR STUDY | | | |
|---|---|---|---|
| REFLECTOR GEOMETRY | DETECTOR | TOTAL POWER (LUMENS) | PEAK ILLUMINANCE ($lm/cm^2$) |
| 4x3 | | 1.28 | 14.07 |
| 3x4 | | 1.38 | 14.03 |
| 3x5 | | 1.52 | 29.71 |
| 3x5.5 | | 1.57 | 28.14 |
| 3x6 | | 1.55 | 31.84 |
| 3x7 | | 1.41 | 19.67 |
| 3x8 | | 1.46 | 32.59 |
| 3x9 | | 1.51 | 36.03 |
| 3x10 | | 1.51 | 32.36 |
| 3x11 | | 1.55 | 29.58 |
| 3x24 | | 1.54 | 24.87 |
| 3x27 | | 1.59 | 19.9 |

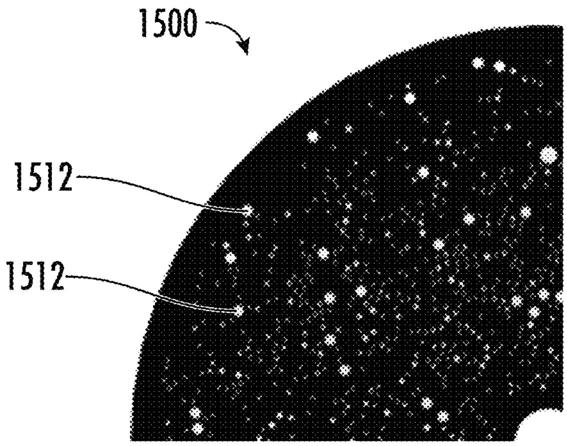
FIG. 15
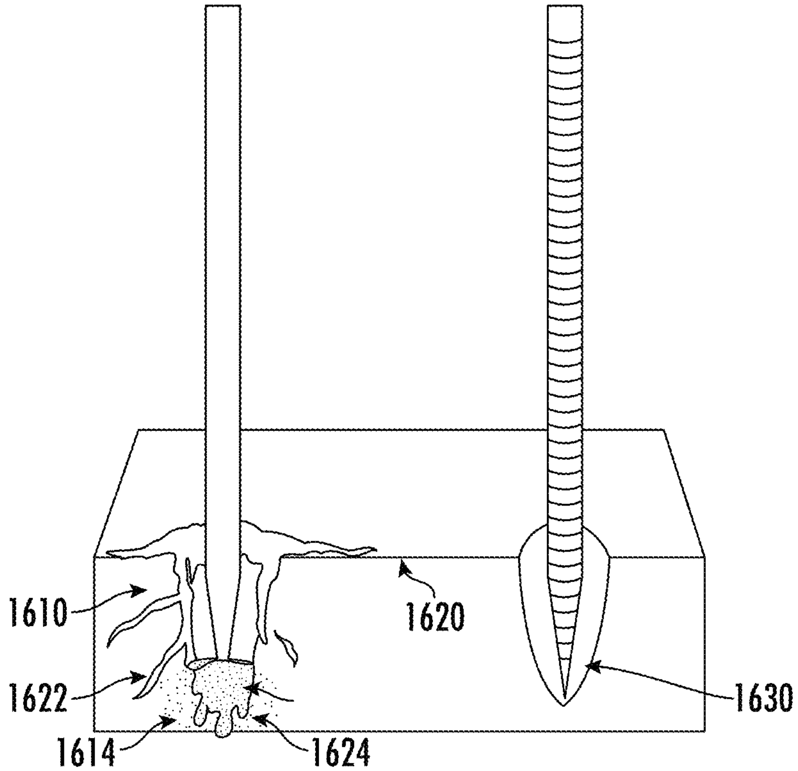
FIG. 16A
(PRIOR ART)
FIG. 16B
(PRIOR ART)

TIMEPIECE WITH LIGHT-AMPLIFYING DESIGN

RELATED APPLICATIONS

This application claims priority to U.S. Provisional Patent Application No. 63/364,239, filed on May 5, 2022, and entitled "Timepiece with Light-Amplifying Design"; the contents of which are hereby incorporated by reference in full.

BACKGROUND

Timepieces and wristwatches, or more commonly referred to as watches, are functional in providing the time of day as well as serving as decorative accessories for personal wear. Various designs have been utilized in the industry to create special effects in the appearance of the dial or face, which is the part of the watch that displays the time. In some examples, watches have incorporated a light source such as a luminescent element or light emitting diode to emit light through openings in the dial. The openings can be the numerals for indicating the time, or geometric patterns in the dial, or other shapes. In other examples, watches have included reflective elements to reflect an image of the watch hands onto the dial, or to aim light toward a particular location on the watch face or in a desired direction. Other types of decorative designs include patterns in the dial itself, such as by using stacked discs to provide a changing appearance of the dial as the discs move relative to each other. Some watches include transparent windows to show the mechanisms within the watch.

These decorative watch designs add aesthetic value to a user. There exists a continuing desire by consumers for new and creative displays in timepieces.

SUMMARY

In embodiments, a timepiece includes a case, a dial in the case, and a reflector underneath the dial. The dial has a plurality of holes through its thickness, wherein the dial is shaped to allow ambient light to enter a region behind the dial. The reflector is configured to direct the ambient light from the region behind the dial to exit through the plurality of holes.

In embodiments, a timepiece includes a case, a dial in the case, and a reflector underneath the dial. The dial is opaque and has a plurality of holes through its thickness, wherein the dial is shaped to allow ambient light to enter a region behind the dial, the ambient light entering through a gap between the case and a perimeter of the dial. The reflector is configured to direct the ambient light from the region behind the dial to exit through the plurality of holes. The region behind the dial is between the dial and the reflector.

BRIEF DESCRIPTION OF THE DRAWINGS

FIG. 8 is a table of experimental results of ambient light captured by a timepiece, in accordance with some embodiments.

FIG. 15 is a partial front view of a dial with holes for emitting light, in accordance with some embodiments.

FIGS. 16A-16B are schematics describing standard laser drilling and pulse laser drilling, as known in the art.

DETAILED DESCRIPTION

The present disclosure describes timepieces with a light-amplifying design that allows ambient light to be captured and utilized in creating unique visual effects in the face of the timepiece. Ambient light enters through a gap in the timepiece, and the light may then be concentrated before exiting through holes in the dial. The holes can be configured in a decorative manner such as patterns or designs that are aesthetically pleasing to the user. Light emitted through the holes in the dial are made visible in varying levels or degrees, depending on the amount of ambient light provided by the environment and depending on how the timepiece is catching the ambient light as the timepiece is moved around. For instance, using a wristwatch as an example, the holes might not be visible at all when the user's arm is in one position, due to the watch being blocked from receiving ambient light in that position. As the user moves and the watch catches light from the environment, the hole pattern may become visible, either partially or fully. The pattern may flicker in and out of visibility as the amount of light that hits the watch changes. The timepieces of the present disclosure can create a sense of awe and wonder as the displayed light pattern changes with the user's movements, when viewed by others from different directions, and depending on the types and directions of the light sources in the environment.

Timepieces of the present disclosure are uniquely constructed with a design that amplifies ambient light to illuminate holes in the dial. In some examples, the ambient light is concentrated by a light channel within the timepiece, such as amplifying light to about ten times the light in the surrounding environment, to create a noticeable visual effect. In embodiments, the surface of the dial may have a dark color, such as a deep black finish, to visually highlight the contrast with the lighted pattern even more.

The timepieces may be, for example, a wristwatch, pocket watch, pendant, or other form of a clock. In this disclosure, these terms shall be used interchangeably, where embodiments can apply to any of these types of timepieces. The holes in the dials may also be referred to as through-holes or apertures. Some components of the timepieces such as clock hands, a crown, and movement mechanisms may not be shown in some figures to simplify the illustrations. The timepieces are generally analog devices with physical clock hands and mechanical mechanisms, where electronic components may also be included as needed.

Figure 1A:
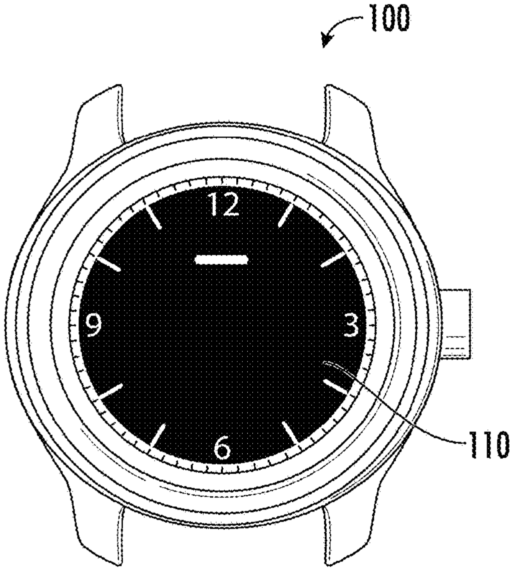
FIGS. 1A-1C are front views of a timepiece, showing varying levels of illumination of a dial in the timepiece, in accordance with some embodiments.
Figure 1B:
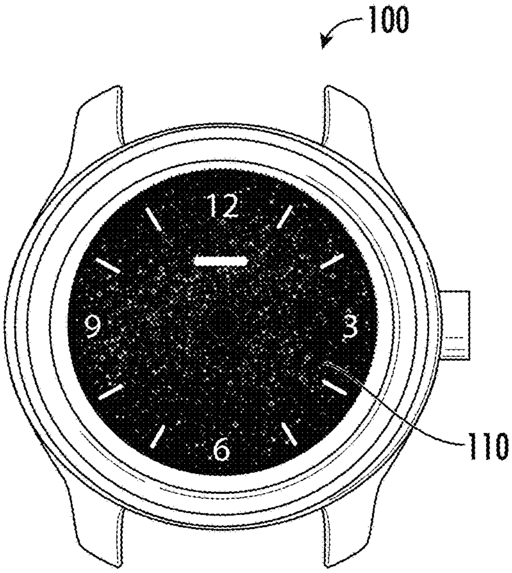
Figure 1C:
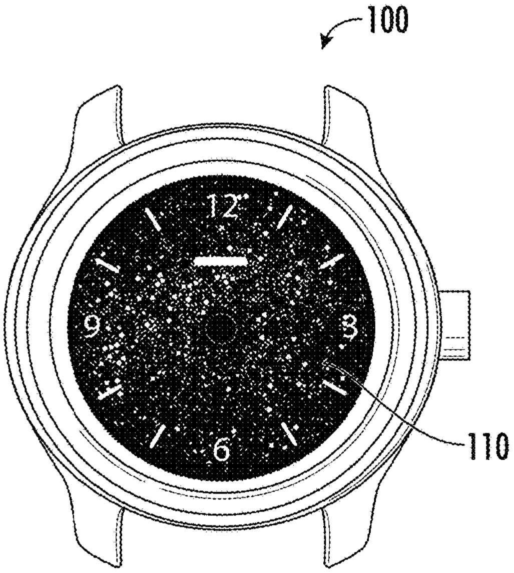

FIGS. 1A-1C show front views of a watch 100, in accordance with some embodiments, in which the appearance of the dial 110 (i.e., face) changes due to different lighting situations in the ambient environment. The dial 110 has a plurality of holes through the thickness of the dial, where varying numbers of the holes become visible depending on the amount and angles of light captured by the watch 100. In FIG. 1A, no hole patterns are visible, as may occur when the watch 100 is in a dark or low light environment. In FIG. 1B some holes in the dial 110 are visible, such as due to having a greater amount of ambient light present than in FIG. 1A, or the watch 100 being positioned to catch a greater amount of ambient light than in FIG. 1A. In FIG. 1C, even more holes are visible due to more ambient light entering the watch 100 than in FIG. 1B (e.g., due to a higher amount of ambient light being available or due to positioning of the watch to capture more of the ambient light). The holes are very small, like pinholes, such as on the order of tenths of a millimeter. The pattern on the dial 110 illustrated in this embodiment is a star map, such as depicting actual stars that are visible to the naked eye, or particular constellations.

Figure 2A:
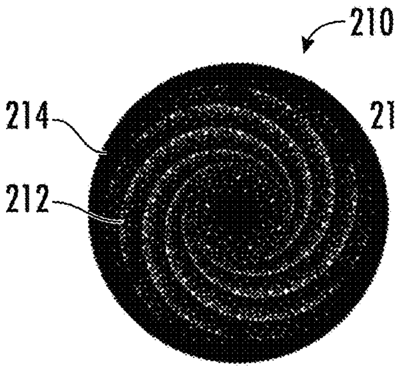
FIGS. 2A-2F are front views of hole pattern designs for dials for emitting light, in accordance with some embodiments.
Figure 2B:
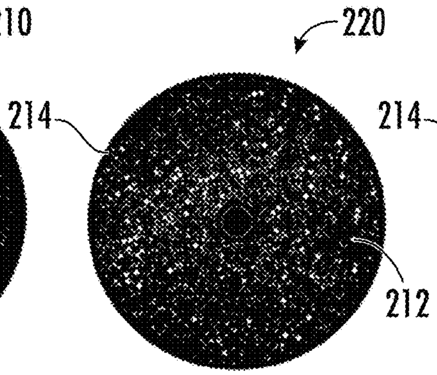
Figure 2C:
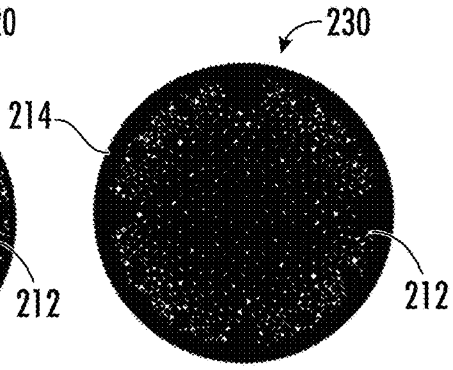

FIGS. 2A-2F are front views of example dials, showing various designs such as geometric patterns or depictions of objects that can be utilized in this disclosure. A plurality of holes can be seen, where holes 212 in the plurality of holes extend through the thickness of the dial material 214 to allow light to pass through. The thickness of the dial material 214 may be, for example, 0.2 mm to 0.4 mm, such as 0.3 mm. FIG. 2A shows a dial 210 in which the plurality of holes is arranged in a swirled spiral pattern. FIG. 2B shows a dial 220 where the holes are arranged to represent a star map as in FIGS. 1A-1C. FIG. 2C shows a dial 230 in which the plurality of holes is arranged in a geometric pattern of clusters that increase in density toward the perimeter of the dial. The holes 212 vary in size within each dial in these examples (e.g., at least two holes in the plurality of holes being different in size from each other), but in other examples the holes in the dial may be a uniform size.

Figure 2D:
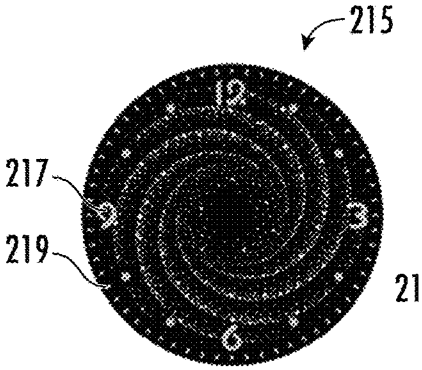
Figure 2E:
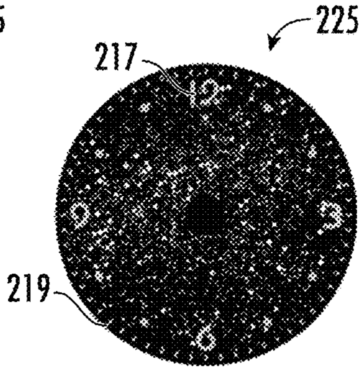
Figure 2F:
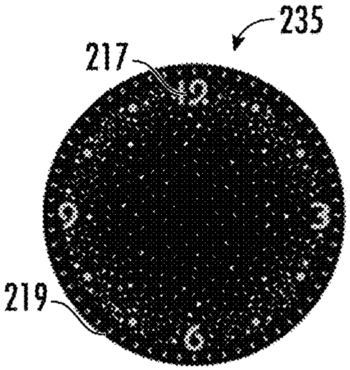

FIGS. 2D, 2E and 2F show dials 215, 225, and 235 that have the same patterns as dials 210, 220 and 230, respectively, but also have numbers 217 and minute marker indices 219 on the dials. The numbers 217 and indices 219 may be, for example, printed on the dials or may be components that are attached (e.g., adhered) to the surface of the dial. In some examples, the numbers and indices may be through-holes that light passes through, similar to the plurality of holes 212. In some examples, different arrangements of the numbers and indices may be used, such as showing all the numbers one through twelve rather than only 3, 6, 9 and 12; or showing 5-minute increments for the indices rather than every minute. Similarly, the numbers and indices on the dial may be placed elsewhere on the dial, such as closer to the center of the dial rather near the outer edges as shown in these examples. The shape and size of the numbers and indices may also be chosen accordingly aesthetic preference, such as in various fonts, or having different shapes for the minute indices (e.g., circles) rather than lines.

Figure 2G:
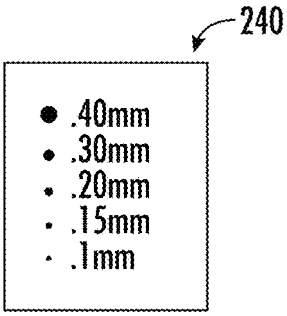
FIG. 2G is a legend for hole sizes in the dials of FIGS. 2A-2F, in accordance with some embodiments.

A legend 240 is provided in FIG. 2G, showing the hole sizes through the thickness of dial material 214 of 0.1 mm, 0.15 mm, 0.20 mm, 0.30 mm, and 0.40 mm for reference to the dials of FIGS. 2A-2F, demonstrating a range of different hole sizes used in each design to produce different light patterns depending on the amount of light captured by the watch. The legend 240 also conveys the very small hole sizes that are used in creating the visual effect of the dial.

In some examples, the dial design can utilize the transient visibility of the holes to convey dynamic effects. For example, the holes can be laid out to represent vapor droplets, where the vapor can appear to flow or disperse across the dial as the light emitted from the watch changes. This dynamic effect may be created by the physical placement of the holes and/or the arrangement of hole sizes (e.g., a gradient of hole sizes across the dial).

In some examples, the dials of the present disclosure (e.g., dial material 214) may be made of metal such as stainless steel, or a ceramic material such as alumina or zirconia. The dials may have a black or dark coating deposited on its front side to provide contrast to the light being emitted from the dial holes.

Figure 3:
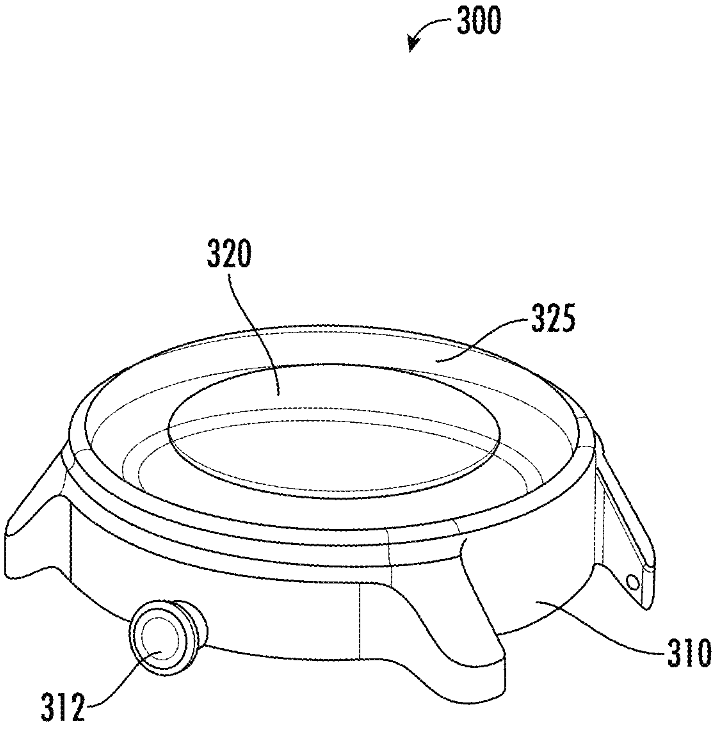
FIG. 3 is a perspective view of a timepiece, in accordance with some embodiments.

FIG. 3 is a perspective view of a timepiece 300, in accordance with some embodiments. A case 310 holds the main components of the timepiece 300, and a transparent piece, referred to as a crystal 320, covers the upper opening of the case 310. A crown 312 on the outer surface of the case 310 is a knob that enables a user to perform functions such as adjusting the hands of the clock, or changing the date displayed by the watch. Although the timepieces of the present disclosure shall be illustrated as circular in overall shape, other shapes are possible such as oval or rectangular. In some embodiments, the crystal 320 may optionally include a lens 325, as shall be described elsewhere in this disclosure. The lens 325 in the example configuration of FIG. 3 is a convex ring around the circumference of the crystal. The crystal 320 may be made of glass, a polymer (e.g., polymethyl methacrylate) or other transparent material.

Figure 4A:
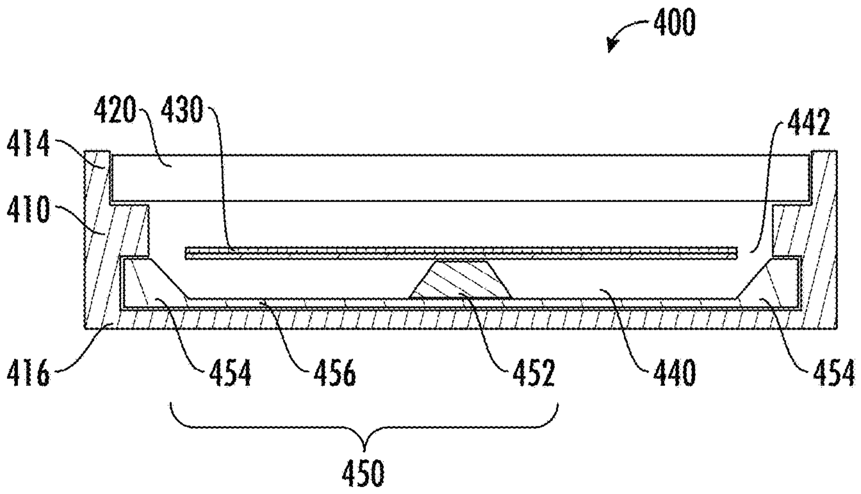
FIGS. 4A-4B show side cross-sections of a watch (i.e., a timepiece), in accordance with some embodiments.

FIG. 4A is a side cross-sectional view of a watch 400, showing a structure for capturing, amplifying, and emitting ambient light, in accordance with some embodiments. Components of the watch 400 include a watch case 410, a crystal 420 seated in a lip 414 of the case 410, and a dial 430 between the crystal 420 and a bottom 416 of the case 410. The clock hands and movement mechanisms are not depicted for simplicity of illustration. The dial 430 is opaque and is shaped to allow light to pass from outside the watch 400 to a region 440 behind the dial. In this embodiment, the dial 430 has a shape that is the same as the interior of a horizontal cross-section of the case 410 (e.g., circular for a circular watch), but slightly smaller so that there is a gap 442 between the perimeter of the dial 430 and the interior of the case 410. Light enters region 440 through gap 442; some light may also enter region 440 through holes (not shown) in the dial 430. The region 440 is an open space between the dial and the bottom of the case that serves as a light channel, in which the ambient light can be directed from the backside of the dial out through holes in the dial. The holes in dial 430 are arranged in a pattern as desired for aesthetic purposes (e.g., FIGS. 2A-2F), where light from the region 440 will exit through the holes to partially or fully illuminate the pattern for viewers to see, depending on the optical angles and amount of light. The dial 430 may have a dark face (e.g., black) on the surface facing the crystal 420, and a mirror coating on the backside facing the region 440.

A reflector 450 is underneath the dial 430, configured in this embodiment with a center reflector 452 near a center of the dial and an outer reflector 454 around the inner perimeter of the bottom of the case 410. A bottom reflector 456 is also included in the reflector 450, seated on the bottom surface of the case 410 and extending between the outer reflector 454 and center reflector 452. Bottom reflector 456 comprises a reflective surface on a bottom interior surface of the reflector 450, as shall be described elsewhere in this disclosure. Components of the reflector 450 (center reflector 452, outer reflector 454, and bottom reflector 456) can be made of metals or plastics, where either type of material may be covered with a reflective (mirror) coating such as silver or aluminum. In the example of FIG. 4A, the outer reflector 454 and bottom reflector 456 are one component, and the outer reflector 454 is a separate piece mounted on the bottom reflector 456. In other examples as shall be described elsewhere in this disclosure, one or more of the outer reflector, center reflector and bottom reflector may be integral with each other or separate components from each other. The region 440 behind the dial is between the dial 430 and the reflector 450.

Figure 4B:
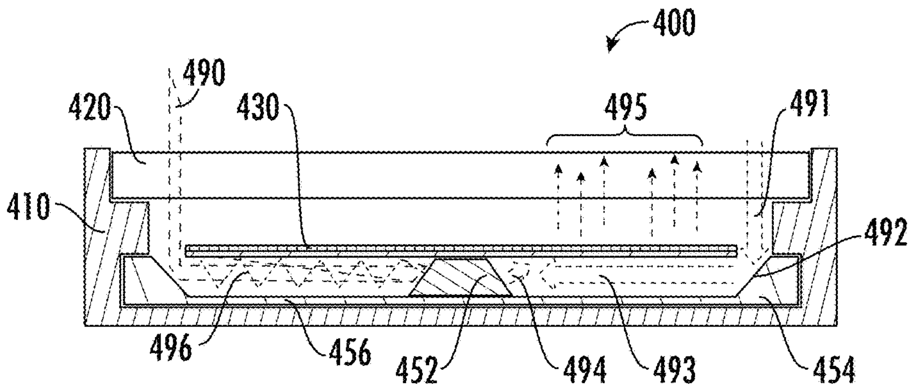

FIG. 4B shows the same watch structure as FIG. 4A but includes arrows to depict a light path for ambient light (arrow 490) to enter and be emitted from the timepiece, in accordance with some embodiments. The arrows 491, 493, 494, and 495 on the right-hand side of FIG. 4B show the light path in a stepwise fashion, while the left-hand side shows the light path as a continuous arrow comprising arrows 490 and 496. Light from the environment passes through the crystal 420 and through the gap 442 (FIG. 4A) between the dial 430 and watch case 410, as indicated by arrow 491. The gap 442 is an entryway into the region 440 (FIG. 4A) in the underside area of the dial, where the region 440 serves as a light trap for concentrating the light. Some ambient light may also enter region 440 through holes in the dial 430. The light reflects off the outer reflector 454 at location 492, which is angled upward toward the dial 430.

For a circular-shaped watch case 410, the outer reflector 454 may be a ring around the interior base of the watch case 410. Light reflected from the outer reflector 454 is directed (indicated by arrow 493) to the center reflector 452, which scatters the light upward (indicated by arrow 494) and across the underside surface of the dial 430. The light then passes through the plurality of holes in the dial to exit the watch as indicated by arrows 495, either directly from center reflector 452 or after further reflections off the dial 430 (back side of the dial 430) and the bottom reflector 456 (indicated by arrows 496). As the user moves the watch 400 (e.g., by moving their wrist that is wearing the watch), the ambient light will be captured in varying intensities by the watch, thereby creating different visual appearances as the resulting light emitted out of the dial changes.

Figure 4C:
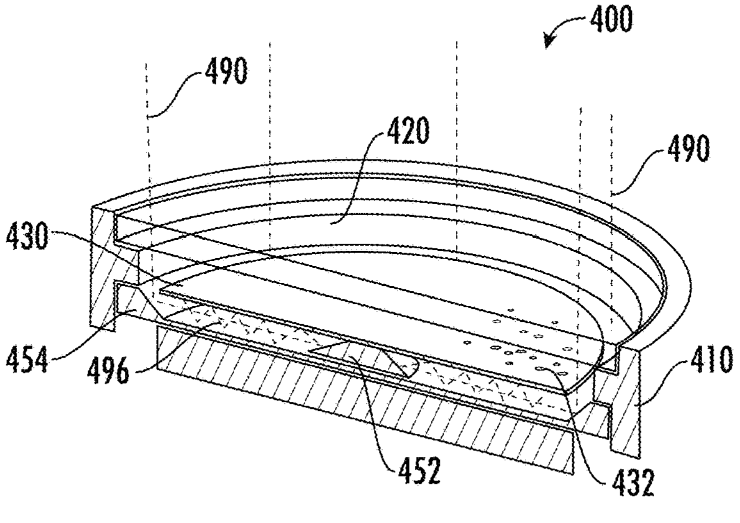
FIG. 4C shows an isometric cutaway view of the watch of FIGS. 4A-4B, in accordance with some embodiments.

FIG. 4C is an isometric cutaway view of the watch components and light path shown in FIGS. 4A-4B. In this example, the watch 400 is depicted as circular, with dial 430 also being circular but a smaller diameter than the interior of the watch case 410. In this manner, the dial 430 is shaped to allow ambient light to enter region 440, via the gap 442 created by the difference in diameters of the dial 430 and interior of the watch case 410. The outer reflector 454 is an angled ring around the circumference of the reflector 450. The center reflector 452 is a post having a frustoconical shape, with the larger end of the cone being on the bottom surface of the case 410 such that the angled surface of the center reflector 452 faces upward toward the dial 430 in this example. As can be seen in FIG. 4C and the left-hand side of FIG. 4B, ambient light 490 can be reflected multiple times (arrows 496) within the light channel region 440 before exiting through the holes 432 in the dial 430, such as off the back surface of the dial and off the bottom reflector 456 (FIG. 4A).

Figure 4D:
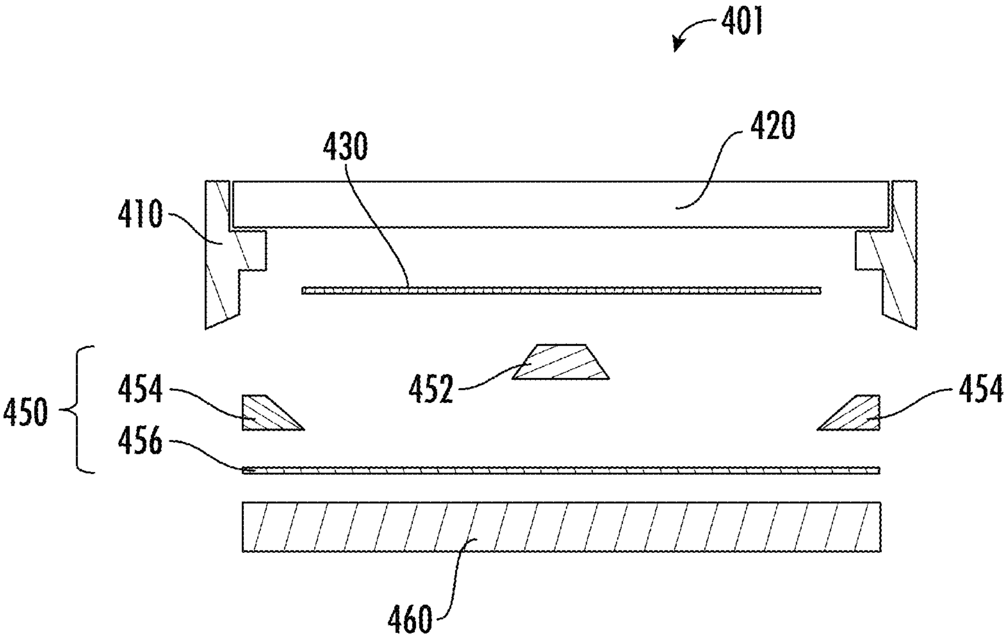
FIGS. 4D-4E show exploded and assembled side cross-sections, respectively, of the watch of FIGS. 4A-4B including a movement housing, where the reflector is made of separate components, in accordance with some embodiments.
Figure 4E:
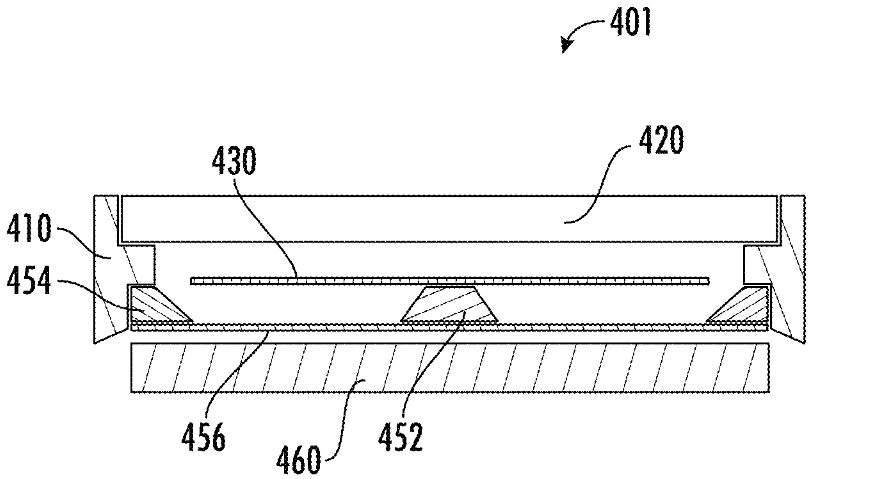

FIGS. 4D and 4E are side cross-sectional views of a watch 401 similar to watch 400, where a watch movement housing 460 is illustrated for holding movement mechanisms of the watch hands (not shown). FIG. 4D is an exploded view, and FIG. 4E is an assembled view. The same components as in FIGS. 4A-4C are shown, including watch case 410, crystal 420, dial 430, and reflector 450 (which includes center reflector 452, outer reflector 454, and bottom reflector 456). In this example, center reflector 452, outer reflector 454, and bottom reflector 456 are all separate components from each other. The reflector components are assembled together in the final manufactured watch 402 as shown in FIG. 4E. If a reflective coating is needed, the reflector components may be coated prior to be assembled together or after the components have been assembled as the reflector 450.

Figure 4F:
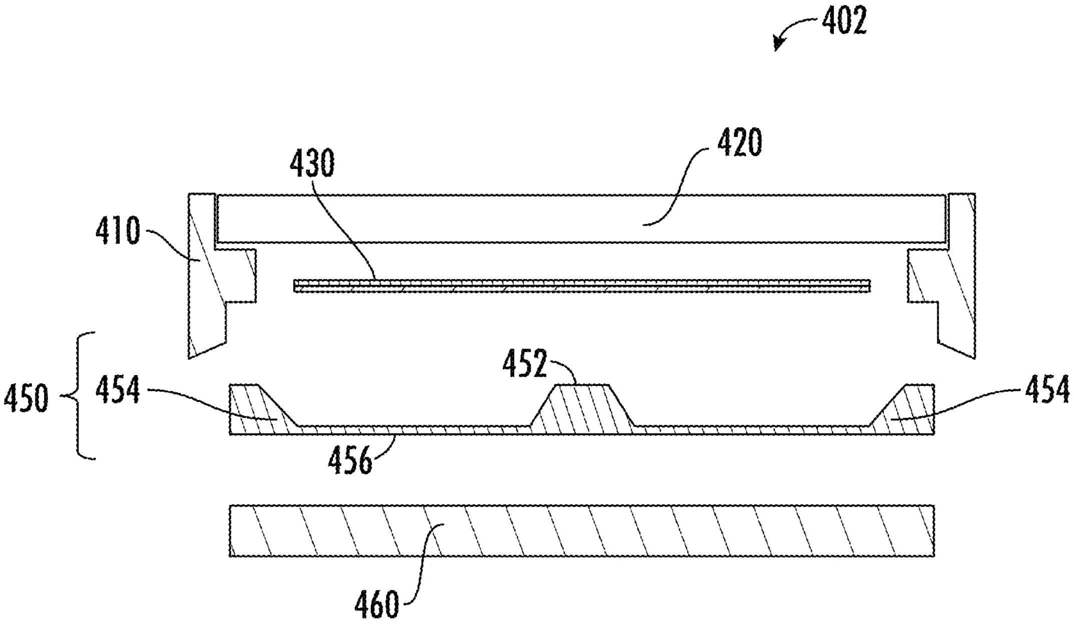
FIGS. 4F-4G show exploded and assembled side cross-sections, respectively, of the watch of FIGS. 4A-4B including a movement housing, where the reflector is made as a single component, in accordance with some embodiments.
Figure 4G:
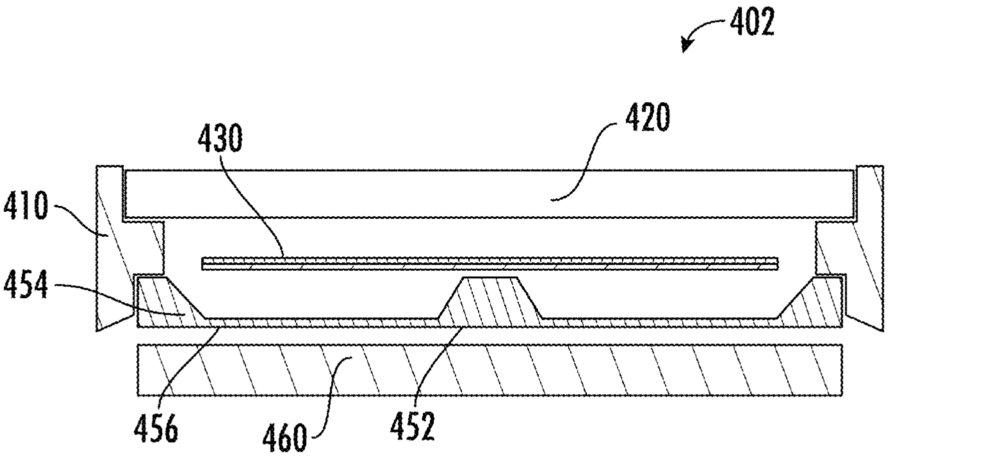

FIGS. 4F and 4G are side cross-sectional views of a watch 402 similar to watch 400 and watch 401, but with the reflector 450 being made as one piece. For example, the center reflector 452, outer reflector 454, and bottom reflector 456 may be a single, integral component milled from metal or molded from plastic, where in either case the reflecting surfaces may be coated with a reflective material.

In some examples, the outer reflector 454 can be replaced by a different type of element to direct the light toward the center reflector. For example, a lens may serve as the outer reflector, refracting the light to direct the ambient light that enters through the gap toward the light channel region. In another example, a fiber optic element may be used as the outer reflector 454 to direct (e.g., "bend" the light) in the required direction.

Figure 5A:
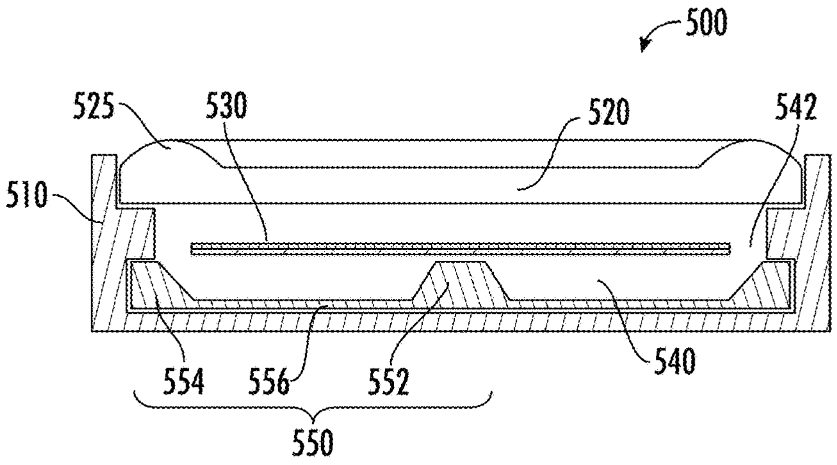
FIGS. 5A-5C show side cross-sectional views of timepieces that include a lens for gathering light, in accordance with some embodiments.

FIG. 5A shows an embodiment of a watch 500 in which a lens may be used to increase the amount of ambient light gathered from the environment. This side cross-sectional view includes the same components as FIG. 4A such as watch case 510, crystal 520, dial 530, light channel region 540, gap 542 between the dial 530 and watch case 510 (i.e., gap 542 extending along an inner perimeter of the watch case 510), and reflector 550 comprising center reflector 552, outer reflector 554, and bottom reflector 556. In addition, the crystal 520 is customized with a lens 525 in the form of a lens ring along the outer edge of the crystal 520. The lens 525 is positioned over the gap 542 to refract incoming light into the gap 542. In this example, the lens 525 is integrally formed with the crystal 520. In another example, the lens 525 may be a separate piece from the crystal 520 and placed on the outer (external) surface of the crystal 520.

Figure 5B:
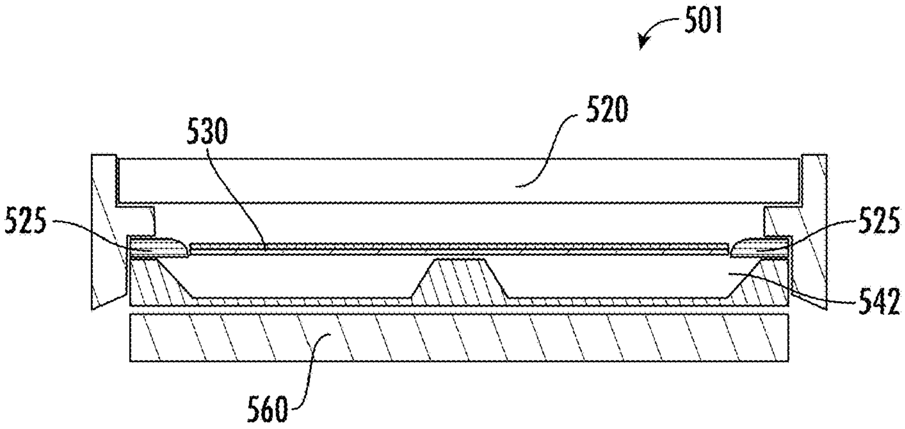

In a further example shown in the watch 501 of FIG. 5B, the lens 525 may be a separate component from the crystal 520 and placed inside the watch 501, between the crystal 520 and the dial 530, and over the gap 542. This example includes the lens 525 to help gather and concentrate light but enables the outer surface of the crystal 520 to remain flat, such as for aesthetic purposes. The illustration of watch 501 shows a movement housing 560, which may also be incorporated into watch 500 of FIG. 5A.

In any of the examples of FIGS. 4A-4G, 5A-5B, and other examples in this disclosure, the lens 525 for gathering ambient light may be a single lens (e.g., one continuous ring) or may include multiple lenses (e.g., more than one lens placed next to each other around the perimeter of the crystal). Considerations in designing characteristics of the lens 525 may include providing enough light concentration to achieve a desired amount of light amplification while keeping the energy flux within a range that will not damage the watch components, such as mirror coatings on the reflectors.

Figure 5C:
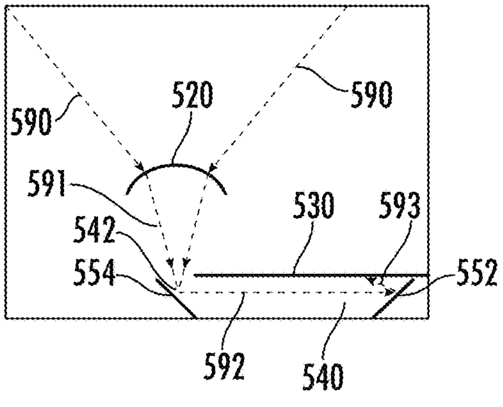

FIG. 5C is a simplified schematic of the left-hand portion of FIG. 5A, illustrating the path of light through the timepiece. The lens 525 enables ambient light (arrow 590) to be gathered from a wider range of angles than without a lens. The light then passes through the gap 542 between the dial 530 and watch case 510 (indicated by arrow 591) and is reflected by the outer reflector 554 to be directed toward center reflector 552 (line 592) through the light channel region 540. The center reflector 552 then reflects the light toward the dial 530 (line 593). Lastly, light exits outward through the holes in the dial 530 after one or more reflections within the light channel region 540.

In computer modeling simulations performed in relation to the present disclosure in which basic indoor room lighting was assumed as the ambient light source, a crystal with a lens produced 1.57 lumens out of the dial holes while a crystal with no lens element produced 1 lumen. This model assumed a center reflector having an upper diameter (top of the frustoconical shape) of 3 mm and a lower diameter of 5.5 mm, as shall be described for FIGS. 9A-9B. This result demonstrates the ability of the lens to provide higher light input into the watch. However, in some embodiments a crystal without a lens may be beneficial in helping to achieve the on/off flicker effect and/or may be preferable aesthetically by some consumers, such as by providing an overall slimmer design. Omitting the lens may also simplify manufacturing, to provide a lower cost timepiece than with a lens. Inclusion of a light-gathering lens in the timepieces of the present disclosure will depend on the desired specifications of the particular product.

Figure 6:
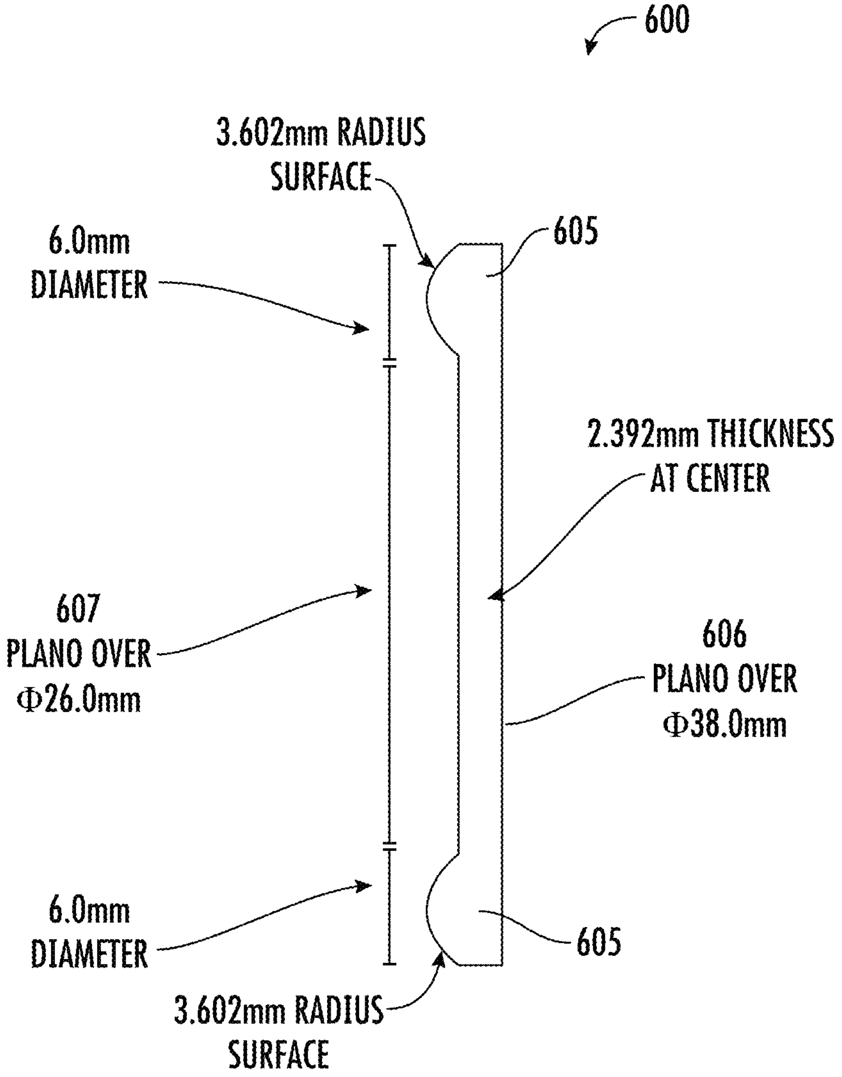
FIG. 6 is a side view of a crystal having a lens, in accordance with some embodiments.

FIG. 6 is a side view of a crystal 600 having a lens 605, with dimensions shown in accordance with one example. The lens 605 is a spherical lens ring integral with the crystal 600 in this example. The total diameter of the crystal 600 is 38 mm, with the back side 606 of the crystal 600 being a plano surface. On the front side 607 of the crystal 600, the width of the spherical lens 605 is 6 mm, with a radius of 3.602 mm. The remainder of the front side 607 is a 26 mm diameter plano surface having a thickness of 2.392 mm (e.g., crystal thickness). In other examples, the thickness of the flat portion of the crystal 600 may be 2.0 mm to 3.0 mm.

Figure 7A:
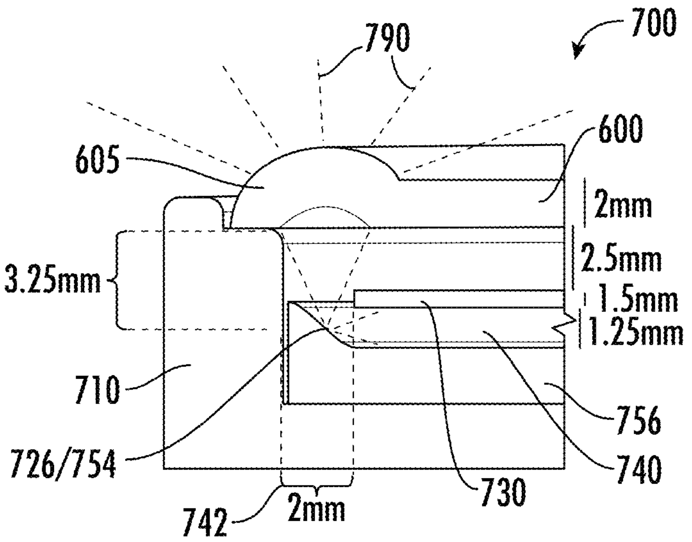
FIGS. 7A-7B show close-up cross-sectional views of a portion of a watch, in accordance with some embodiments.
Figure 7B:
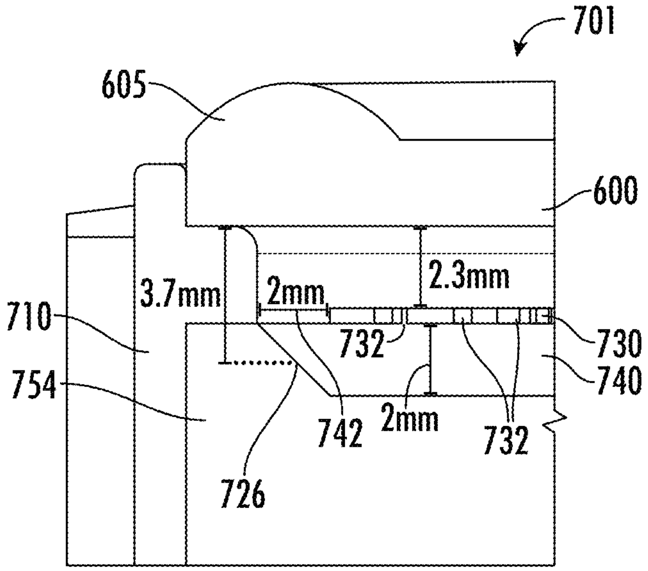

FIGS. 7A-7B show detailed cross-sectional views 700 and 701 of the lens 605 of FIG. 6 in relation to the light entrance gap 742. In these views of the area near the gap 742 and outer reflector 754, example dimensions are shown. The lens 605 captures light 790 from a range of angles and is placed over the gap 742 to direct the light to the outer reflector 754. In the embodiments of FIGS. 7A-7B, the gap distance (width of gap 742) between the outer edge of the dial 730 and the inner surface of the watch case 710 is 2 mm. In some embodiments, the width of the gap 742 is at least 2 mm to enable to enough light to enter to achieve a 10× amplification of the level of ambient light. In some embodiments, the gap distance may range from 1 mm to 4 mm.

In the embodiment of FIG. 7A, a focal point 726 of the lens 605 is 3.25 mm from the bottom surface of the crystal 720 to a midpoint of the angled surface of the outer reflector 754. In one example, the lens 605 creates a 2 mm diameter image of the source at the 3.25 mm focal point. The planar portion of the crystal 600 has a thickness of 2 mm, the distance between the bottom of the crystal 600 to an upper surface of the dial 730 is 2.5 mm, the thickness of the dial 730 is 1.5 mm, and the height of the light channel region 740 (from the back side of the dial 730 to the top surface of the bottom reflector 756) is 1.25 mm. FIG. 7B is similar to FIG. 7A but having the focal point 726 being 3.7 mm from the bottom of the crystal 600 to the midpoint of the angled surface of the outer reflector 754. The distance from the bottom of the crystal 600 to the top surface of the dial 730 is 2.3 mm, and the height of the light channel region 740 is 2 mm. In the view of FIG. 7B, cross-sections of the holes 732 in the dial 730 are shown, where the holes 732 have different diameters from each other to enhance the changing visual effect as the timepiece is moved around or is exposed to situations with different levels of light.

The dimensions of FIGS. 7A-7B may also apply to embodiments in which a lens is not included, such as having a crystal that is flat or has a curvature that is not configured to specifically focus light in the gap area. The dimensions of FIGS. 7A-7B are examples and can be modified to accommodate specifications and dimensions of the overall watch. For example, a watch may be specified to have a sleeker look with a lower profile lens and less vertical spacing between the components in the watch (e.g., crystal, dial, light channel region, outer and bottom reflectors). In another example, the dimensions may be customized based on the overall size of the case, the height of the lip of the case, or other aspects that may impact the optical path of light entering and traveling through the watch.

FIG. 8 is a table 800 showing results of computer modeling simulations based on the lens and light trap design of FIGS. 6 and 7B. Various light sources to generate ambient light were used in the model, as shown in the "Type" column 810, with the corresponding luminance of the light sources shown in lumens per square centimeter per steradian (lm/$cm^2$ sr) in the next column 820. The types of light sources used were a 60 Watt, 4-inch incandescent bulb; a 55 Watt fluorescent ring with 15 cm radius; natural sunlight at noon; and a 6-inch, 1000 lumens spotlight with a 40° full angle. The light sources (except for the natural sun) were placed at 1.25 m from the watch. The illuminance collected by the lens is shown in column 830, listed both as lm/$cm^2$ and as a flux in lumens. The resulting illuminance output through the holes in the dial was calculated as shown in column 840. The illuminance output represents an average from the plurality of holes across the surface of the dial. The light outputs from the dial that resulted from the artificial light sources ranged from 0.07 to 0.10 lm/$cm^2$. The output from a noontime sun as the light source was much greater, at 12.44 lm/$cm^2$. To provide a frame of reference, the peak luminance of a typical liquid crystal display monitor is 0.03 $lm/cm^2$. The results of FIG. 8 show that the optical system of the timepiece can produce significant light amplification of the ambient light that enters the watch, which can provide a noticeably visible effect in the face of the watch. In embodiments, the timepiece design with a lens can produce a 10× to 17× magnitude amplification of a baseline luminance. The baseline luminance is the amount of ambient light reflected off the front of a dial having an average gray surface with 70% reflectance, without being amplified by a light channel region.

Figure 9A:
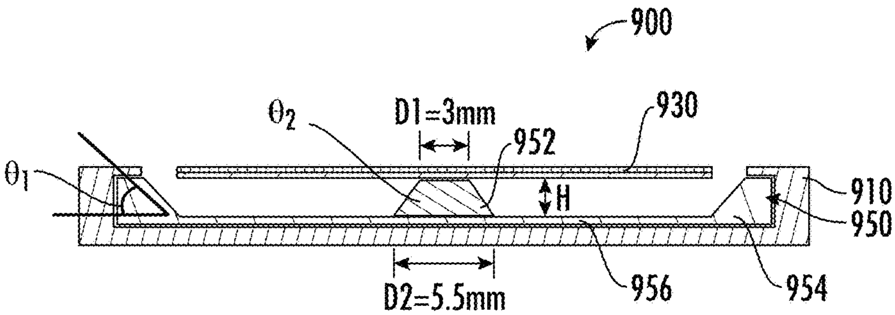
FIGS. 9A-9B are side cross-sectional views of embodiments of reflectors used in timepieces, in accordance with some embodiments.
Figure 9B:
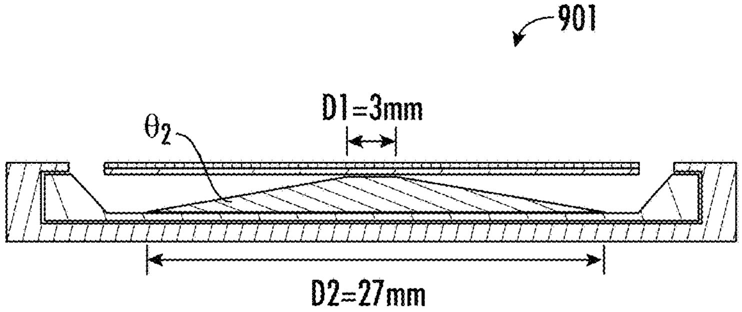

FIGS. 9A-9B show side cross-sectional views of a watch 900 and 901, respectively, that demonstrate designing angles for the reflectors. Components such as the crystal are omitted for clarity. The figures show a watch case 910, a dial 930, and a reflector 950 with its portions of a center reflector 952, outer reflector 954 and bottom reflector 956. As described elsewhere in this disclosure, the center reflector 952 (which may also be referred to as a center post) can be integral with the outer reflector 954 and/or the bottom reflector 956, or one or more of the individual reflectors 952, 954, 956 can be separate components from each other. In some examples, the outer reflector 954 can be part of the watch case 910 or can be a separate component from the watch case 910.

In FIGS. 9A-9B the angle $\theta_1$ of the outer reflector 954 with respect to the bottom of the watch case 910 may be approximately 45°, such as 43° to 47° or 40° to 50°. In some embodiments, the center reflector 952 may be specifically designed to amplify the ambient light before it is emitted through the dial holes. That is, the slant angle $\theta_2$ of the center reflector 952 (angle between the bottom of the base of the center reflector 952 and the angled surface of the center reflector 952) can be tailored to achieve a desired light amplification level or to maximize the amplification.

In FIG. 9A the center reflector 952 has an upper diameter D1 of 3 mm and a lower diameter D2 of 5.5 mm. Accordingly, the center reflector 952 of FIG. 9A may be referred to as a 3 mm×5.5 mm cone (which shall be notated as 3×5.5). In FIG. 9B the upper diameter is 3 mm, and the lower diameter is 27 mm (i.e., 3×27). Assuming the height H of the center reflector is 2 mm (distance between the dial 930 and bottom reflector 956 in FIG. 7B), the 3×5.5 center reflector 952 of FIG. 9A has a slant angle $\theta_2$=58°, while the 3×27 center reflector 952 of FIG. 9B has a slant angle $\theta_2$=9.5°. The remainder of the components of FIGS. 9A-9B (e.g., crystal, gap, and dial) may have dimensions as described in FIGS. 6 and 7A-7B.

Figure 10:
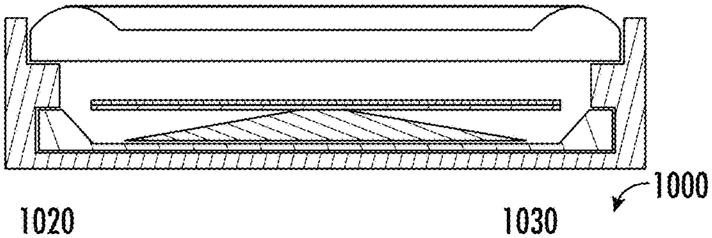
FIG. 10 shows results of a study of different center reflector designs, in accordance with some embodiments.

In various embodiments, the center reflector is carefully designed to maximize the amount of lumens produced, while preventing light from escaping back out through the gap. To study the design for the light trap (e.g., region 440 of FIG. 4A), light tracing software was used to model the light output that can be achieved by various center reflector shapes. An ambient environment with five light sources (configured to represent average indoor lighting) was simulated in the software, and various reflectors were tested and refined to determine the best reflector shape (i.e., conical angle) that can output the greatest amount of light from the decorative holes in the dial. Example results are shown in table 1000 of FIG. 10. The reflector geometry in column 1010 of the table 1000 shows upper and lower diameters of the center reflector. For example, "3×4" is a center post with upper diameter D1=3 mm and lower diameter D2=4 mm. The "4×3" test case was an inverted cone (i.e., cone angle toward the bottom reflector), with D1 (4 mm) being larger than D2 (3 mm). The total power in lumens is shown in the middle column 1020, representing the average output across the dial surface as measured (in the simulation) by a detector above the holes. The peak illuminance from the dial surface is shown in column 1030.

As can be seen in the "Total Power" results of column 1020, it was unexpectedly found that the light output did not vary directly with the increase in reflector diameter (i.e., shallower angle $\theta_2$). For example, power output was high for the 3×5.5 and 3×6 center reflector shapes but was lower for diameters D2 smaller or larger than those values. However, the output for the 3×11, 3×24 and 3×27 shapes were comparable to the 3×5.5 and 3×6 (i.e., around 1.55 lumens). These results show that the design of the reflectors in the light trap is not straightforward but instead requires careful design to determine how to produce the highest light output. In various examples of timepieces in accordance with the present disclosure, the slant angle $\theta_2$ may be approximately 53° to 58° (corresponding to the 3×6 and 3×5.5 center reflectors, respectively) or 9° to 27° (corresponding to the 3×27 and 3×11 center reflectors, respectively).

Figure 11A:
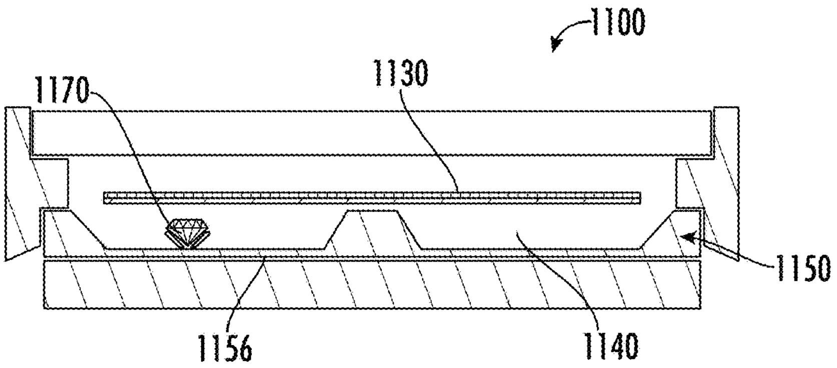
FIGS. 11A-11B are side cross-sectional views of designs that include light-enhancing elements behind the dial, in accordance with some embodiments.
Figure 11B:
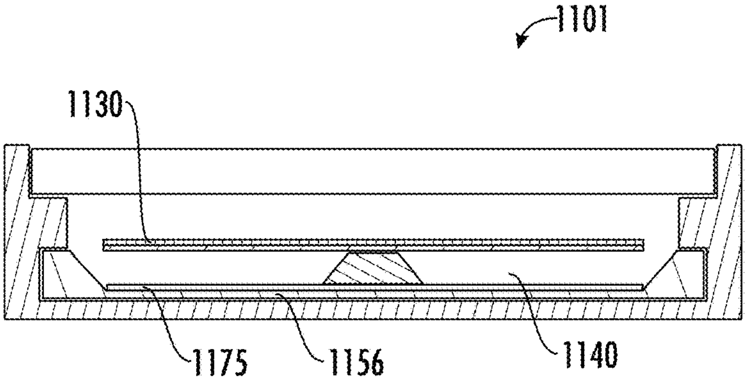

In some examples, light output can be further increased, enhanced, or altered by including light-enhancing elements, as shown in the side cross-sectional views of FIGS. 11A-11B. Watch 1100 of FIG. 11A shows a light-enhancing element 1170 within the light trap region 1140, under the dial 1130. The light-enhancing element 1170 is coupled to the reflector 1150, such as the top surface of bottom reflector 1156. The light-enhancing element 1170, which may be a diamond or other refraction element such as a glass prism, can add further visual or decorative effect due to the sparkling effect created by the refraction element. In some examples, the light-enhancing element 1170 can add colors to the light emitted through the dial 1130, such as by using colored diamonds or prisms. In examples that include a refraction element as the light-enhancing element 1170, larger hole sizes in the dial may be used compared to embodiments without the diamonds, to enable the diamond effect to be more noticeable. Although just one light-enhancing element 1170 is shown in FIG. 11A, more than one light-enhancing element may be included at various locations on reflector 1150. When multiple light-enhancing elements 1170 are included, the light-enhancing elements may all be identical or may be different from each other such as varying in size, color, shape, and/or refractive properties.

In another example of a light-enhancing element as shown in watch 1101 of FIG. 11B, a layer of glow in the dark material 1175 can be added onto the bottom surface of the light channel region 1140, such as on the bottom reflector 1156. The glow in the dark material 1175 can absorb ultraviolet radiation from light as the light passes through the light channel region 1140, causing the glow in the dark layer to fluoresce. The fluorescence can add to the light emitted from the light channel region and through the dial 1130.

Figure 12:
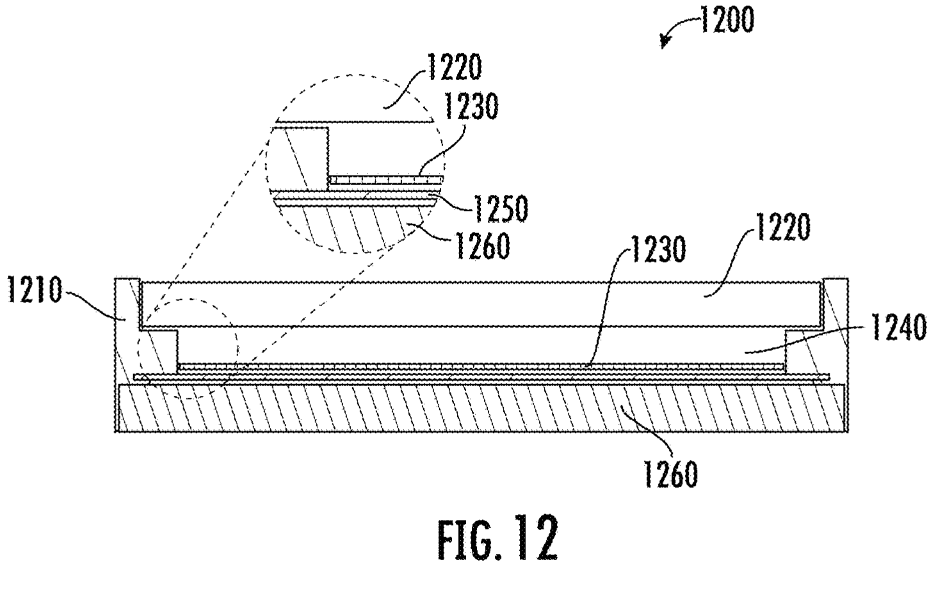
FIG. 12 is a side cross-sectional view of a timepiece in which the dial is mounted on a reflector, in accordance with some embodiments.

FIG. 12 shows another example of a watch 1200 that illuminates the dial but without a light trap region. Similar to previous examples, watch 1200 includes a watch case 1210, a crystal 1220 seated on a top opening of the watch case, a dial 1230 inside the watch case 1210, and a movement housing 1260 on the back side of watch case 1210. In this example, dial 1230 has holes (not shown) through its thickness as described previously and a dark coating on its top surface (facing crystal 1220). However, dial 1230 in this example does not have a mirror coating on its back side. Instead, the reflector 1250, which is sandwiched between dial 1230 and movement housing 1260, provides a reflective surface for the back side of the dial 1230. Dial 1230 is mounted on the reflector 1250 that is coupled to the top of movement housing 1260. Light enters through crystal 1220, goes to open space 1240 between crystal 1220 and dial 1230, and passes through holes in the dial 1230. The light is then reflected off reflector 1250 and is emitted back out through crystal 1220 for the user to see. The proximity of the dial 1230 to the reflector 1250 in FIG. 12 may increase the ability to see the dial's hole pattern, particularly for designs involving identifiable art like the night sky star pattern. Watch 1200 may also provide a slimmer profile than embodiments that include a light trap region between the dial and reflector.

Figure 13:
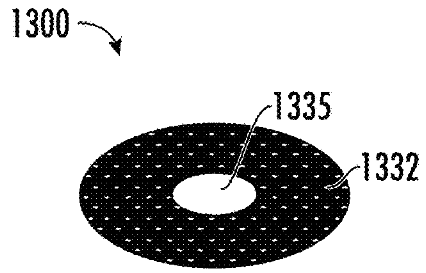
FIG. 13 is a perspective view of an alternative design for a dial, in accordance with some embodiments.

FIG. 13 shows an alternative embodiment of a dial 1300 for a timepiece in which ambient light enters the watch through an aperture 1335 in the center of the dial 1300 rather than through the gap around the perimeter of the dial as in previous examples. In such a design, light reflects off of the center reflector (e.g., center reflector 452 of FIG. 4A) first and then to the outer reflector (e.g., outer reflector 454 of FIG. 4A). Light may then exit through holes 1332, either directly after bouncing off the outer reflector or indirectly after multiple reflections in a light channel region. The outer reflector can have its shape (i.e., angle $\theta_1$) tailored to maximize light output as was described in relation to FIGS. 9A-9B. The dial 1300 with the center aperture 1335 may also include a lens over or under the aperture, as described for the edge gap examples elsewhere in this disclosure.

In examples as described herein, a timepiece includes a case, a dial in the case, and a reflector underneath the dial. The dial has a plurality of holes through its thickness, wherein the dial is shaped to allow ambient light to enter a region behind the dial. The reflector is configured to direct the ambient light from the region behind the dial to exit through the plurality of holes. In some embodiments, the dial is shaped to have a gap between the case and a perimeter of the dial to allow the ambient light to enter. The reflector may comprise a center reflector and an outer reflector, wherein the outer reflector is positioned below the gap and directs the ambient light toward the center reflector. The center reflector may have a frustoconical shape and may have a slant angle of, for example, 9° to 27° or 53° to 58°. In some examples, the timepiece may include a lens over the gap, extending along an inner perimeter of the casing, where the lens may be, for example, a spherical lens. In some examples, the timepiece may include a bottom reflector on a bottom interior surface of the reflector. In some examples, at least two holes in the plurality of holes have diameters that are different from each other. In some examples, each hole in the plurality of holes has a diameter in a range from 0.1 mm to 0.5 mm. In some examples, the timepiece further includes a light-enhancing element in the region behind the dial.

In examples as described herein, a timepiece includes a case, a dial in the case, and a reflector underneath the dial. The dial is opaque and has a plurality of holes through its thickness, wherein the dial is shaped to allow ambient light to enter a region behind the dial, the ambient light entering through a gap between the case and a perimeter of the dial. The reflector is configured to direct the ambient light from the region behind the dial to exit through the plurality of holes. The region behind the dial is between the dial and the reflector. In some examples, the reflector comprises a center reflector and an outer reflector, wherein the outer reflector is positioned below the gap and directs the ambient light toward the center reflector. In some examples, the center reflector has a frustoconical shape and may have a slant angle of, for example, 9° to 27° or 53° to 58°. In some examples, the timepiece may include a lens over the gap, extending along an inner perimeter of the case. In some examples, the timepiece may include a bottom reflector on a bottom interior surface of the reflector. In some examples, at least two holes in the plurality of holes have diameters that are different from each other. In some examples, each hole in the plurality of holes has a diameter in a range from 0.1 mm to 0.5 mm. In some examples, the timepiece further includes a light-enhancing element in the region behind the dial, where the light-enhancing element may be, for example, a refraction element or a glow in the dark material. In some examples, the dial comprises a ceramic such as zirconia and has a back surface facing the region behind the dial, the back surface covered with a mirror coating.

Figure 14A:
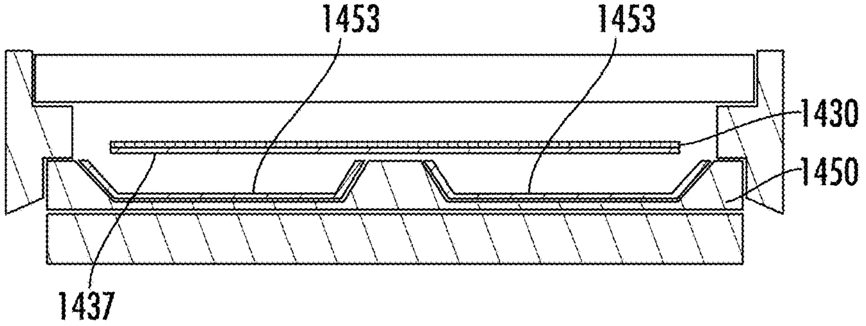
FIGS. 14A-14C illustrate reflective coating surfaces of a time piece, in accordance with some embodiments.
Figure 14B:
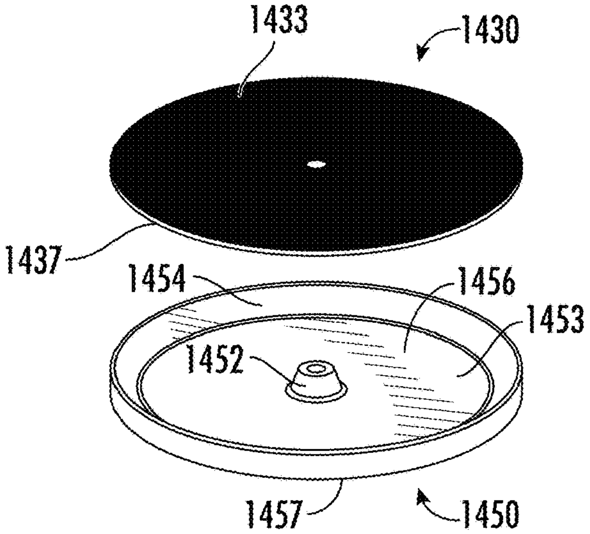
Figure 14C:
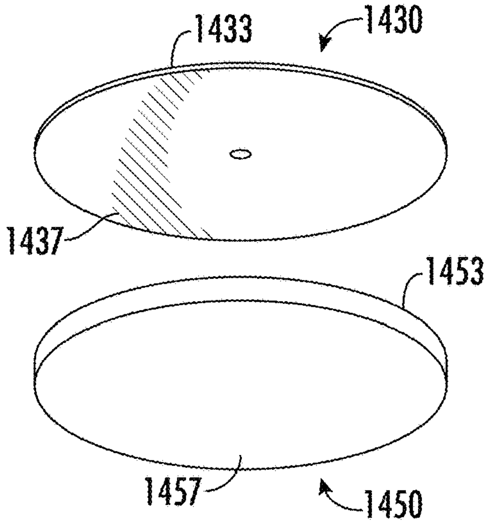

FIGS. 14A-14C illustrate examples of mirror-coated surfaces in timepieces with light-amplifying designs, in accordance with embodiments. FIG. 14A is a side cross-sectional view similar to previous examples, having a dial 1430 and a reflector 1450 which may represent any of the dials or reflectors described in this disclosure. FIG. 14B is a top isometric view of the dial 1430 and reflector 1450, in which the dark top surface 1433 of dial 1430 and the reflective top surface 1453 of reflector 1450 can be seen. The reflective top surface 1453 covers the various portions of the reflector 1450, such as center reflector 1452, outer reflector 1454 and bottom reflector 1456 (interior flat surface of reflector 1450). FIG. 14C is a bottom isometric view of the dial 1430 and reflector 1450, in which the reflective bottom surface 1437 (i.e., back side or back surface) of dial 1430 and the uncoated bottom surface 1457 (exterior back side) of reflector 1450 can be seen. The reflective bottom surface 1437 of dial 1430 and the reflective top surface 1453 of reflector 1450 may be fabricated using, for example, plasma vapor deposition (PVD), and may be made of mirror coatings such as aluminum or silver. In one example, the dial 1430 is made of zirconia or other ceramic material, and the reflective bottom surface 1437 (which faces the light trap region behind the dial) is fabricated by covering the back surface of the dial 1430 with a mirror coating, such as by applying the mirror coating via PVD, In timepieces with light-amplifying designs of the present disclosure, the holes in the dial are very small (e.g., pinholes) to create an illusion that the emitted light transiently appears seemingly out of nowhere. For example, the plurality of holes in the dial may include micro-holes of 0.1 mm to 0.5 mm in diameter. The diameter of 0.1 mm may be chosen as the smallest hole to use in the dial, being the smallest dot size that can be seen by a human naked eye. Using a range of hole diameters in the dial can give depth to the illusion. An example of a decorative pattern is shown in the partial section of a dial 1500 in FIG. 15, having holes 1512 illustrating stars in a night sky.

These small holes sizes are extremely difficult to make in a dial that typically has a thickness of approximately 0.4 mm. Hole sizes of 0.1-0.5 mm are even smaller than what a printer or screen-printing system can create. The general rule of thumb for hole drilling is that holes cannot be created smaller than the thickness of the material being drilled. Manufacturing issues include overheating of the material when making small holes relative to the thickness of the material. Conventional techniques for making small holes in thin materials include chemical etching, standard laser drilling, or 3D printing. Chemical etching and conventional laser cutting are very limited in the depth-to-hole-size ratio that can be produced. Micro-drilling is not economical for more than a few holes. Hole drilling with electrical discharge machining (EDM) was also investigated in relation to this disclosure but was deemed to be not feasible.

It was uniquely discovered in development of the present devices that pulse laser drilling can be used to make the holes in the dial. Although pulse laser drilling is a known technique, pulse laser companies that were contacted in relation to this disclosure did not expect that a plurality of holes of 0.1 mm diameter could be made in the dial. In refining the pulse laser parameters, the pulse laser technique was found to be successful, allowing for micro-sized holes to be made. FIGS. 16A-16B show differences between standard laser drilling (long pulse laser, FIG. 16A) and pulse laser drilling (short pulse laser, FIG. 16A). FIG. 16A shows a recast layer 1610, a melt zone 1612, and a heat affected zone 1614 resulting from standard laser drilling, all of which can damage the workpiece and alter properties of the material in the region around the drilled hole. Types of damage from standard laser drilling can include a damaged surface 1620, micro cracking 1622, and shock waving 1624. In contrast, short pulse laser drilling depicted in FIG. 16B beneficially limits damage to the drilled material by creation of a plasma field 1630 (i.e., a dense ion field), to result in a cold ablation technique. Limiting the damage to the material is extremely important when making the very small hole sizes for the dials of the present disclosure.

The dials of the present disclosure can also involve tight spacing of the holes, which is also challenging to achieve. In some instances, the spacing between edges of holes may be as small as 0.125 mm, which is extremely difficult to manufacture conventionally. Short pulse laser drilling can enable creation of these close spacings between holes. In some embodiments, ceramic can be used as the material for the dial, to further reduce the occurrence of warping which can occur when the density of holes is high. Examples of ceramic materials that can be utilized include, for example, alumina or zirconia.

Figure 17:
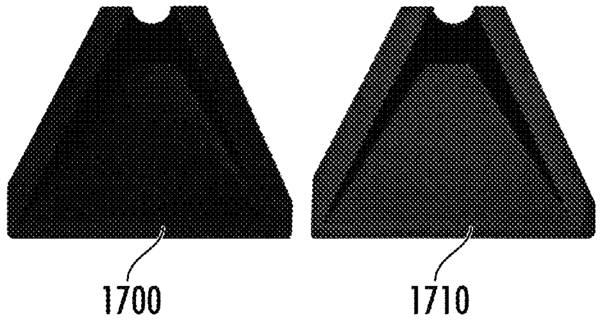
FIG. 17 (PRIOR ART)
FIG. 17 depicts super black coating compared with conventional black coating, as known in the art.

The color of the dial face can enhance the visual effect of the decorative pattern when light is emitted through the dial. In some embodiments, a "super black coating" can be used to coat the top surface of the dial (surface that faces the user). These types of coatings have extremely low reflectance, resulting in an appearance that is much deeper black that standard black materials used by consumers. A comparison between a sample 1700 of super black coating and a sample 1710 of conventional black is shown in FIG. 17. In the present disclosure, a super black coating can be used to heighten the contrast between the gathered light under the dial and the dial surface itself. One example of a super black coating that may be used is LAMBERTIAN BLACK™ by Acktar Ltd. In some examples, the super black coating may be applied by plasma vapor deposition to provide a coating thickness on the order of microns. This thinness of the coating is important so that the coating does not fill in the micro-sized holes of the dial.

Figure 18:
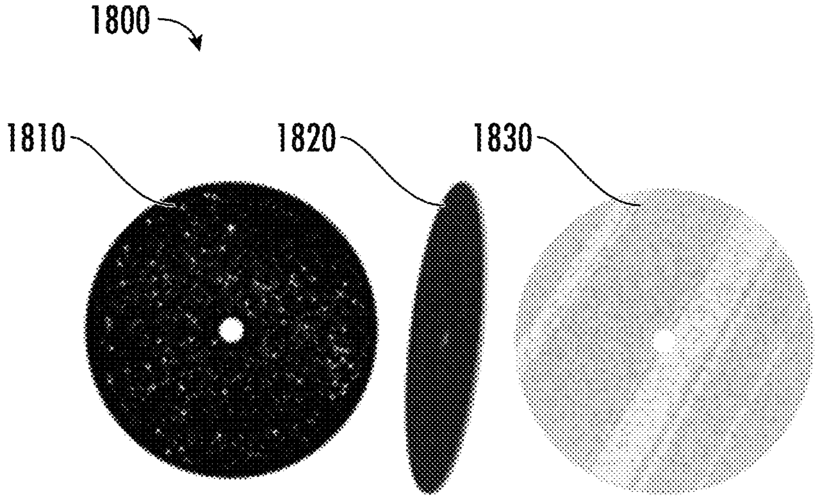
FIG. 18 shows views of a dial having black coating on its front side, in accordance with some embodiments.

FIG. 18 includes various views of a dial in accordance with some embodiments, where the super black coating is seen on the front side. FIG. 18 shows a front surface 1810 (i.e., top surface that is visible to the user when assembled into a timepiece), a side view 1820, and a back surface 1830 of dial 1800. The back surface 1830 (i.e., back side) may provide a reflective surface for the light channel region, where the back surface 1830 may remain uncoated if the dial is naturally reflective such as metal. In other examples, the back surface may have a reflective coating applied, such as if the dial is ceramic.

In some examples, the dial 1800 may be made from a technical ceramic (high-performance or engineering ceramic, e.g., zirconia) with a matte finish on front surface 1810 and high polish on the back surface 1830. The material for the dial 1800 should be chosen to be amenable to the processing methods needed for applying the reflective coatings and creating the small-sized holes in the dial. For example, some ceramics are porous, making PVD mirror coating difficult. Accordingly, ceramics (or other material) chosen for dials of the present disclosure may be non-porous when PVD is utilized to deposit coatings on the ceramics. Also, PVD requires surfaces to be polished, and thus the material chosen for the dial should be able to undergo polishing techniques if PVD will be used as a coating method.

Figure 19A:
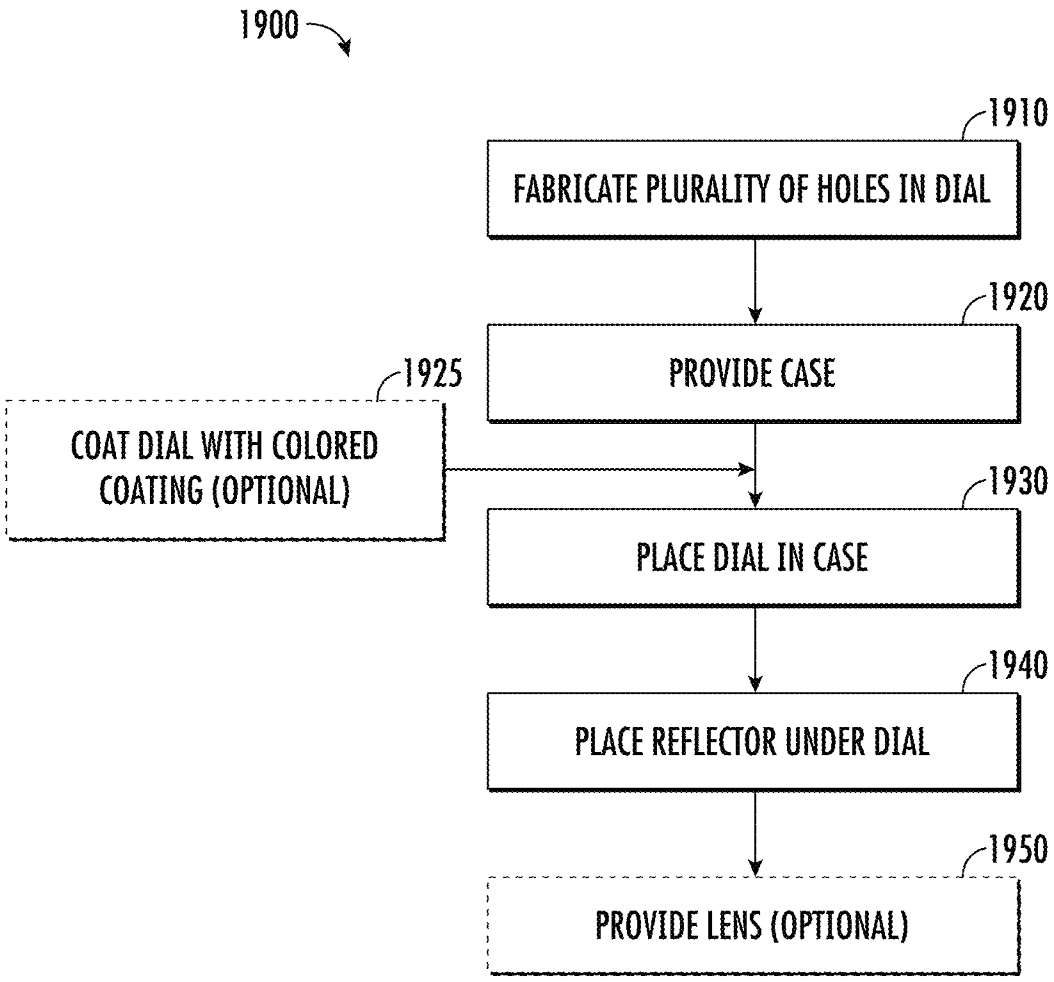
FIGS. 19A-19B are flowcharts representing a method of manufacturing a timepiece, in accordance with some embodiments.

In embodiments represented by the flowchart of FIG. 19A, a method 1900 of manufacturing a timepiece with light-amplifying features includes block 1910 of fabricating a plurality of holes through a thickness of a dial using, for example, pulse laser drilling (i.e., short pulse laser). Each hole in the plurality of holes may have a diameter in a range from 0.1 mm to 0.5 mm, such as at least one hole with a diameter in a range from 0.1 mm to 0.5 mm. The holes in the plurality of holes may be the same or different sizes as each other. Method 1900 also involves providing a watch case in block 1920 and placing a dial in the case in block 1930, where the dial may be shaped to allow ambient light to enter a region behind the dial as described herein. A reflector is placed underneath the dial in block 1940, where the reflector directs the ambient light from the region behind the dial to exit through the plurality of holes. The dial may be made of, for example a ceramic material. In some embodiments, if the dial is not already provided with the desired color, the method 1900 incudes block 1925 of coating a front side of the dial with a colored coating (e.g., dark color such as black) using, for example, plasma vapor deposition. The colored coating may be, for instance, a super black coating.

In embodiments of the method 1900 of FIG. 19A, the dial is shaped to have a gap between the case and a perimeter of the dial to allow the ambient light to enter. The reflector may have a center reflector and an outer reflector, wherein the outer reflector is positioned below the gap and directs the ambient light toward the center reflector. The center reflector may have a frustoconical shape, wherein a slant angle of the center reflector may be, for example, 9° to 27° or 53° to 58°. The reflector may include a bottom reflector on a bottom surface of the region. The method may optionally include block 1950 of providing a lens over the gap, such as extending along an inner perimeter of the case.

Figure 19B:
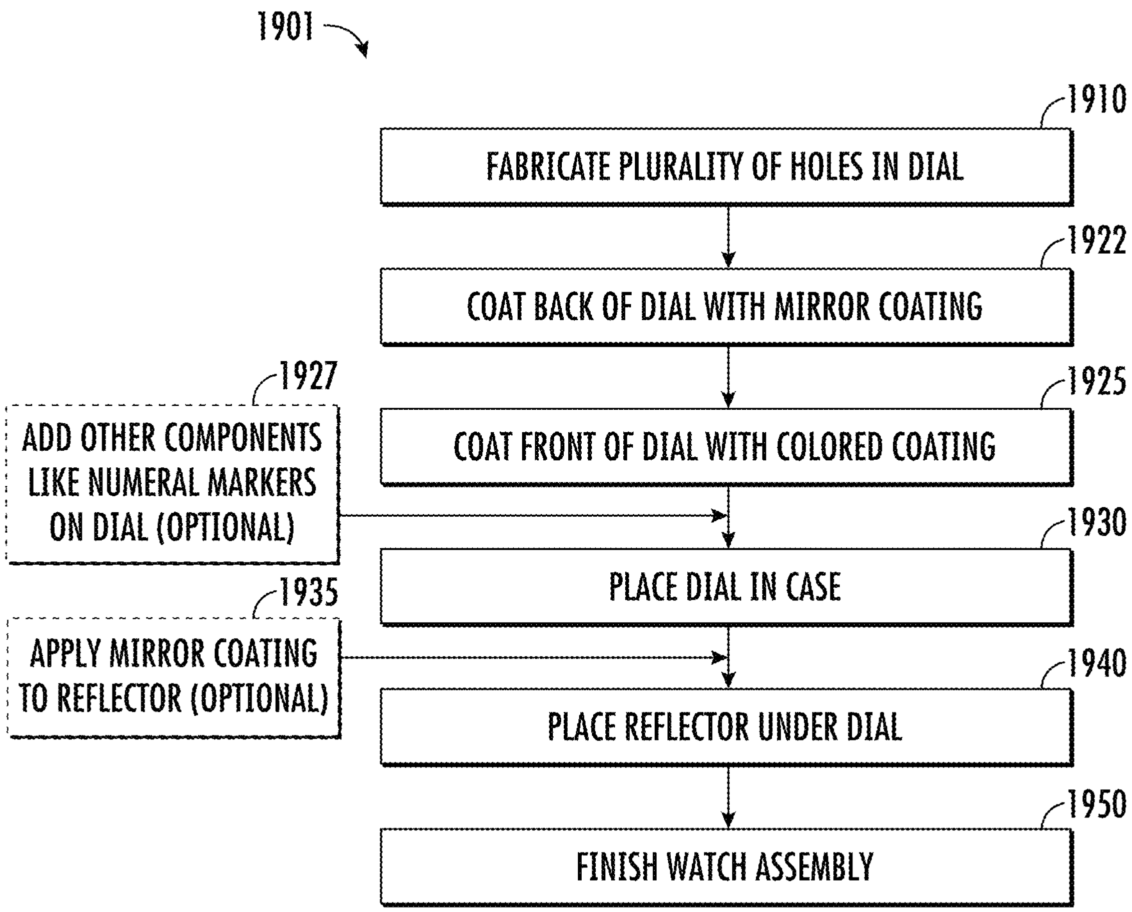

FIG. 19B is a flowchart of a method 1901 of manufacturing a timepiece with light-amplifying features, showing further example details that may be performed. The method 1901 includes block 1910 of fabricating a plurality of holes through a thickness of a dial using, for example, pulse laser drilling (e.g., short pulse laser). The dial may be made of, for example a ceramic material. Each hole in the plurality of holes may have a diameter in a range from 0.1 mm to 0.5 mm, such as at least one hole with a diameter in a range from 0.1 mm to 0.5 mm. The holes in the plurality of holes may be the same or different sizes as each other. In block 1922, the back of the dial may be coated with a mirror coating, such as by using PVD to apply aluminum or silver. Block 1925 involves coating a front side of the dial with a colored coating (e.g., dark coating, super black coating) using, for example, PVD. Optionally, in block 1927 other components may be added onto the dial such as numerals for telling time, minute markers (e.g., indices), or other aesthetic embellishments (e.g., decorative colors). The other components may be added by, for example, printing or adhering the components onto the dial.

Method 1901 also involves providing a case and placing the dial in the case in block 1930, where the dial may be shaped to allow ambient light to enter a region behind the dial as described herein. A reflector is placed underneath the dial in block 1940, where the reflector directs the ambient light from the region behind the dial to exit through the plurality of holes. The reflector portions (e.g., center reflector, outer reflector, bottom reflector) may be assembled from one or more components depending on whether one or more of the portions are made integrally with each other or as separate pieces. In some examples, method 1901 may optionally include block 1935 of applying a mirror coating to the reflector. In other examples, the reflector may naturally be made of a reflective material (e.g., metal) and may not require a mirror coating. After all the components have been fabricated and assembled, the watch assembly is finished in block 1950.

For the flowcharts of FIGS. 19A and 19B, the particular steps, order of steps, and combination of steps are shown for illustrative and explanatory purposes only. Other embodiments can implement different particular steps, orders of steps, and combinations of steps to achieve similar functions or results.

As has been described herein, timepieces of the present embodiments provide unique visual effects in a dial using ambient light. The ambient light is amplified by the optical components of the timepiece, providing eye-catching displays for the user and other observers. In this disclosure, features of the various examples may be interchanged with each other, such as using different slant angles of the center reflector in the different embodiments, using a one-piece or multi-piece reflector in the different embodiments, or including a lens in the optical path of light entering the light channel region.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A timepiece comprising:

a case;

a dial located in the case, the dial being opaque and having a plurality of holes through its thickness, wherein the dial is shaped to allow ambient light to enter a region behind the dial; and a reflector located underneath the dial, wherein the reflector is configured to direct the ambient light from the region behind the dial to exit through the plurality of holes.

2. The timepiece of claim 1, wherein the dial is shaped to have a gap between the case and a perimeter of the dial to allow the ambient light to enter.

3. The timepiece of claim 2, wherein the reflector comprises a center reflector and an outer reflector, wherein the outer reflector is positioned below the gap and directs the ambient light toward the center reflector.

4. The timepiece of claim 3, wherein the center reflector has a frustoconical shape.

5. The timepiece of claim 4, wherein the center reflector has a slant angle of 9° to 27° or 53° to 58°.

6. The timepiece of claim 2, further comprising a lens positioned over the gap, extending along an inner perimeter of the case.

7. The timepiece of claim 1, wherein the reflector comprises a bottom reflector on a bottom interior surface of the reflector.

8. The timepiece of claim 1, wherein at least two holes in the plurality of holes have diameters that are different from each other.

9. The timepiece of claim 1, wherein each hole in the plurality of holes has a diameter in a range from 0.1 mm to 0.5 mm.

10. The timepiece of claim 1, further comprising a light-enhancing element in the region behind the dial.

11. A timepiece comprising:

a case;

a dial located in the case, the dial being opaque and having a plurality of holes through its thickness, wherein the dial is shaped to allow ambient light to enter a region behind the dial, the ambient light entering through a gap between the case and a perimeter of the dial; and a reflector located underneath the dial, wherein the reflector is configured to direct the ambient light from the region behind the dial to exit through the plurality of holes;

wherein the region behind the dial is between the dial and the reflector.

12. The timepiece of claim 11, wherein the reflector comprises a center reflector and an outer reflector, wherein the outer reflector is positioned below the gap and directs the ambient light toward the center reflector.

13. The timepiece of claim 12, wherein the center reflector has a frustoconical shape.

14. The timepiece of claim 11, further comprising a lens positioned over the gap, extending along an inner perimeter of the case.

15. The timepiece of claim 11, further comprising a bottom reflector on a bottom interior surface of the reflector.

16. The timepiece of claim 11, wherein at least two holes in the plurality of holes have diameters that are different from each other.

17. The timepiece of claim 11, wherein each hole in the plurality of holes has a diameter in a range from 0.1 mm to 0.5 mm.

18. The timepiece of claim 11, further comprising a light-enhancing element in the region behind the dial.

19. The timepiece of claim 18, wherein the light-enhancing element is a refraction element or a glow in the dark material.

20. The timepiece of claim 11, wherein the dial comprises zirconia and has a back surface facing the region behind the dial, the back surface covered with a mirror coating.

* * * * *